US008797675B2

(12) United States Patent
Birtzer et al.

(10) Patent No.: US 8,797,675 B2
(45) Date of Patent: Aug. 5, 2014

(54) ADAPTIVE SEEK LATENCY

(75) Inventors: Mark Larry Birtzer, Rosemount, MN (US); Raye Abdoulie Sosseh, Minneapolis, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/403,821

(22) Filed: Feb. 23, 2012

(65) Prior Publication Data

US 2013/0222944 A1 Aug. 29, 2013

(51) Int. Cl.

*G11B 5/596* (2006.01)
*G11B 7/00* (2006.01)

(52) U.S. Cl.

USPC .................................... 360/78.08; 369/44.27

(58) Field of Classification Search

USPC .................... 360/78.07, 78.04, 78.08, 78.06; 369/44.27, 44.28, 47.1, 47.36, 47.28; 711/111, 112

See application file for complete search history.

(56) References Cited

U.S. PATENT DOCUMENTS

| | | | | |
|---|---|---|---|---|
| 7,061,714 | B1 * | 6/2006 | Yu | 360/78.07 |
| 7,114,029 | B1 * | 9/2006 | Thelin | 711/112 |
| 7,411,757 | B2 * | 8/2008 | Chu et al. | 360/69 |
| 7,420,765 | B2 * | 9/2008 | Saito et al. | 360/78.06 |
| 7,486,471 | B2 * | 2/2009 | DeRosa | 360/78.08 |
| 8,364,992 | B2 * | 1/2013 | Guthrie et al. | 713/320 |
| 2008/0013204 | A1 * | 1/2008 | Saito et al. | 360/78.06 |

OTHER PUBLICATIONS

Zoran Dimitrijevic, Raju Rangaswami, Edward Y. Chang, Systems Support for Preemptive Disk Scheduling, IEEE Transactions on Computers, Oct. 2005, pp. 1314-1326, vol. 54 No. 10, IEEE Transactions on Computers, US.

Seagate Technology LLC, Seagate's Sound Barrier Technology (SBT), From: Disc Product Marketing found at http://www.seagate.com/docs/pdf/whitepaper/sound_barrier.pdf, Nov. 2000, pp. 1-6, No. TP-388, Seagate Technology LLC, US.

Sridhar Chratradhi,Hard Drive for Low Power Energy Efficiency in Disk Storage, Presented at the 1st Berkeley Symposium on Energy Efficient Electronic Systems, Jun. 12, 2009, pp. 1-24, Hitachi Global Storage Technologies, Berkeley, CA, US.

* cited by examiner

*Primary Examiner* — Nabil Hindi

(74) *Attorney, Agent, or Firm* — Cesari & Reed LLP; Kirk A. Cesari

(57) ABSTRACT

The disclosure is related to systems and methods for adaptive seek latency in a rotating storage device. In one example, a servo control circuit can be configured to determine a seek latency and provide the seek latency to another controller or control circuit that is configured to implement the seek latency. Further, the servo control circuit can calculate the seek latency based on a measurement of a variable condition of a device and the servo controller can adjust the seek latency as the condition varies. In some examples, the variable condition may include power measurements, temperature measurements, a fault rate, other conditions, or any combination thereof. Also, different algorithms for calculating the seek latency may be implemented based on a selected goal of the system, such as power savings or reduced head vibration.

20 Claims, 5 Drawing Sheets

ADAPTIVE SEEK LATENCY

BACKGROUND

Disc drives may have seek latencies due to the amount of time needed to move a read/write head from one location to another location. In a command queuing environment, a disk drive may rearrange an order of commands to minimize seek latency. However, undesirable results such as excessive power consumption or head vibration may occur. Therefore, there is a need for improved systems and methods of addressing seek latency.

SUMMARY

In one embodiment, a servo control circuit or controller may be configured to determine a seek latency and provide the seek latency to another controller or control circuit configured to implement the seek latency.

In another embodiment, a method may comprise receiving a value based on a condition of a data storage device and adjusting a seek latency based on the value.

In yet another embodiment, a device may comprise an interface circuit to receive commands; a memory having a command queue to store pending commands; a data storage controller to execute the pending commands to transfer data from a data storage medium; and a servo controller configured to calculate a seek latency and provide the seek latency to the interface to implement the seek latency with respect to a pending command.

DETAILED DESCRIPTION

In the following detailed description of the embodiments, reference is made to the accompanying drawings which form a part hereof, and in which are shown by way of illustration of specific embodiments. It is to be understood that other embodiments may be utilized and structural changes may be made without departing from the scope of the present disclosure.

Figure 1:
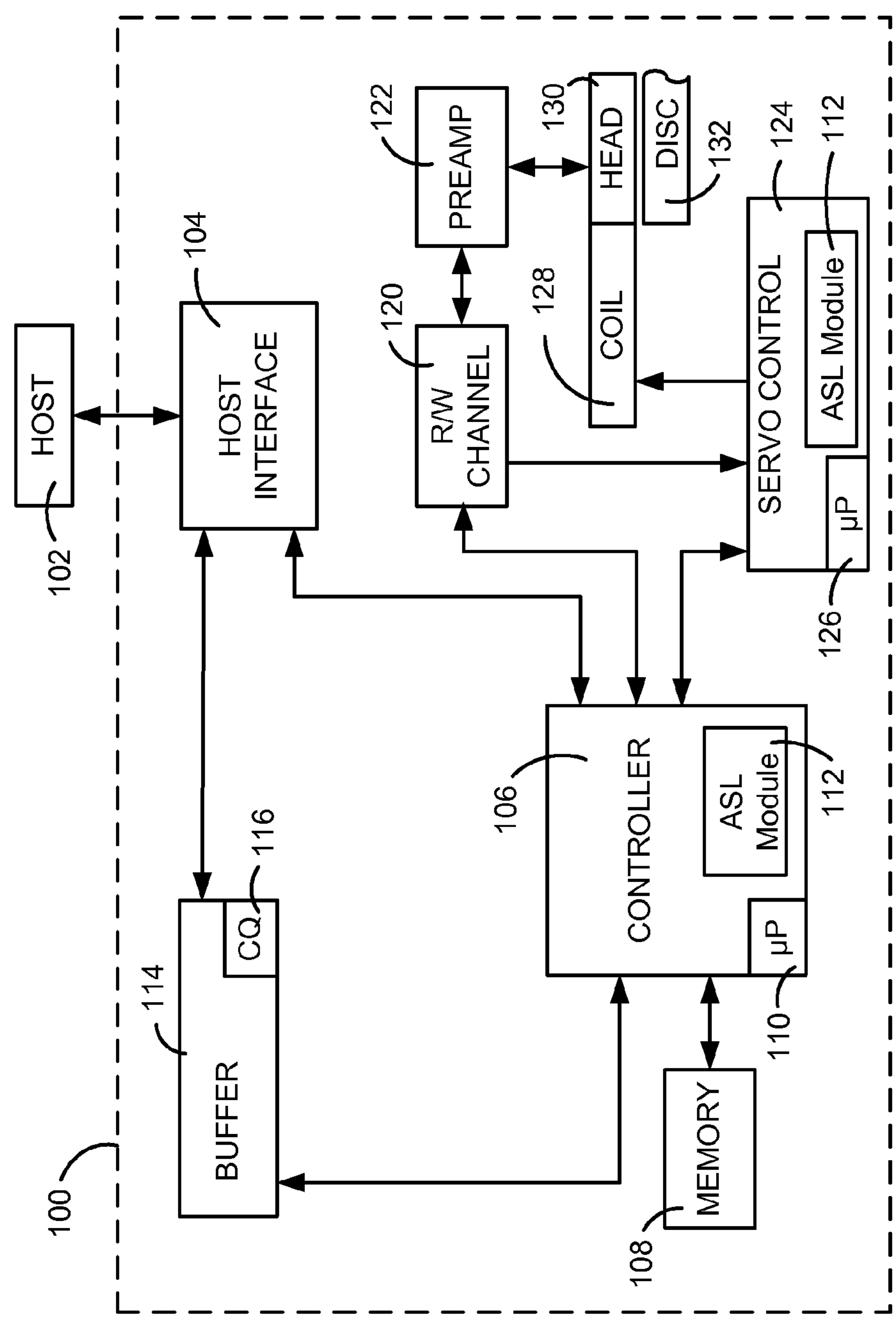
FIG. 1 is a diagram of an illustrative embodiment of a system for adaptive seek latency.

Referring to FIG. 1, an embodiment of a system for adaptive seek latency is shown and generally designated 100. Specifically, FIG. 1 provides a functional block diagram of a disc drive data storage device (DSD) 100. The data storage device 100 can communicate with a host device 102 via a hardware/firmware based host interface circuit 104 that may include a connector (not shown) that allows the DSD 100 to be physically removed from the host 102. The buffer 114 can temporarily store user data for read and write operations and can include a command queue (CQ) 116 where multiple pending operations can be temporarily stored pending execution. The DSD 100 can include a programmable controller 106 with associated memory 108 and processor 110.

Further, FIG. 1 shows the DSD 100 can include a read/write (R/W) channel 120, which can encode data during write operations and reconstruct user data retrieved from disc(s) 132 during read operations. A preamplifier/driver circuit (preamp) 122 can apply write currents to the head(s) 130 and provide pre-amplification of readback signals. A servo control circuit 124 may use servo data to provide the appropriate current to the coil 128 to position the head(s) 130. The controller 106 can communicate with a processor 126 to move the head(s) 130 to desired locations on the disc(s) 132 during execution of various pending commands in the command queue 116.

The servo control 124 (or controller 106 in some embodiments) may also include an adaptive seek latency (ASL) module 112 to calculate a variable value for an additional latency delay based on various conditions that may continuously change. The additional latency may be provided to the controller 106 or the host interface circuit 104 to add the additional latency between seeks. The additional latency may be added to a next pending seek command that is scheduled to be executed after the last executed seek command. In some examples, adding the additional latency can reduce the rate of seeking to provide a power savings. In other examples, adding the additional latency can increase an amount of time allowed for vibration of the head(s) 130 to diminish.

The servo control 124 may implement the ASL module 112 as firmware that is able to calculate a value that can vary incrementally as a function of various conditions. The servo firmware may adjust the latency continuously as measured conditions change. The measured conditions may include any combination of the following: ambient drive temperature, a component temperature such as Voice Coil Motor (VCM) coil temperature, power consumption, component power consumption such as VCM power consumption, an off-track fault rate after a seek is complete, or probability of an off-track write event estimated by a detection algorithm. The servo firmware can also alter a just-in-time (JIT) seeking in conjunction with additional latency in order to provide additional vibration damping time if needed. A just-in-time (JIT) seek method can calculate how much time is available until a specific sector rotates around to be under the head(s) 130. The JIT seek method can adjust the speed of a seek to use a full amount of time available, which may be faster if the target sector is close by or slower if the target sector is nearly a full revolution away.

Figure 2:
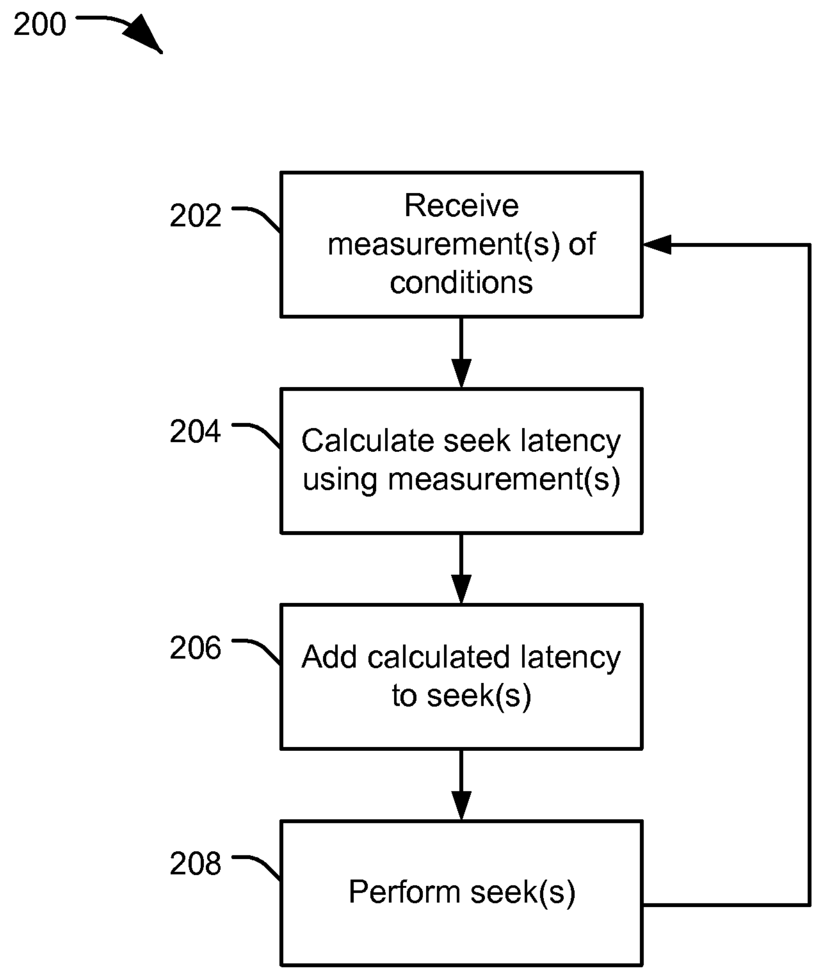
FIG. 2 is a diagram of an illustrative embodiment of a method for adaptive seek latency.

Referring to FIG. 2, an embodiment of a method for adaptive seek latency is shown and generally designated 200. In some examples, a data storage device that utilizes a servo control system may implement the method 200; such a data storage device may be able to read servo information from a rotatable data storage medium. Generally, a servo circuit may be configured to determine a seek latency based on various conditions. The various conditions may include measurements received by the servo circuit, such as temperature, power consumption, or error event measurements. Based on the various conditions, the additional seek latency may be variably increased or decreased.

In some embodiments of the method 200, the changes in seek latency may be implemented to achieve power savings or to reduce head jitter. The method 200 may be performed within a servo control system that may provide a seek latency that has a continuously variable level and that can be modified in real-time.

The method 200 may include receiving one or more measurements of conditions, such as temperature, power consumption, or error events, at 202. The method 200 may then calculate a seek latency using the one or more measurements, at 204. The calculations may include algorithms selected to provide specific benefits to the data storage device, such as power savings, reduced head jitter, performance, temperature control, acoustic control, or error rate reductions.

The method 200 may then add the calculated latency to seeks, at 206, such as by providing an indication of the calculated latency from the servo control system to the seek management controller. The servo control system may provide a latency value to the seek management controller after a seek command, in response to a seek command, upon inquiry by the seek management controller, or selectively as determined by the servo control system. In some examples, the seek management controller may be an interface controller that organizes a queuing of pending commands or may be a data storage controller. The seeks may then be performed with the added latency, at 208, where the added latency may increase or decrease between different seeks.

Figure 3:
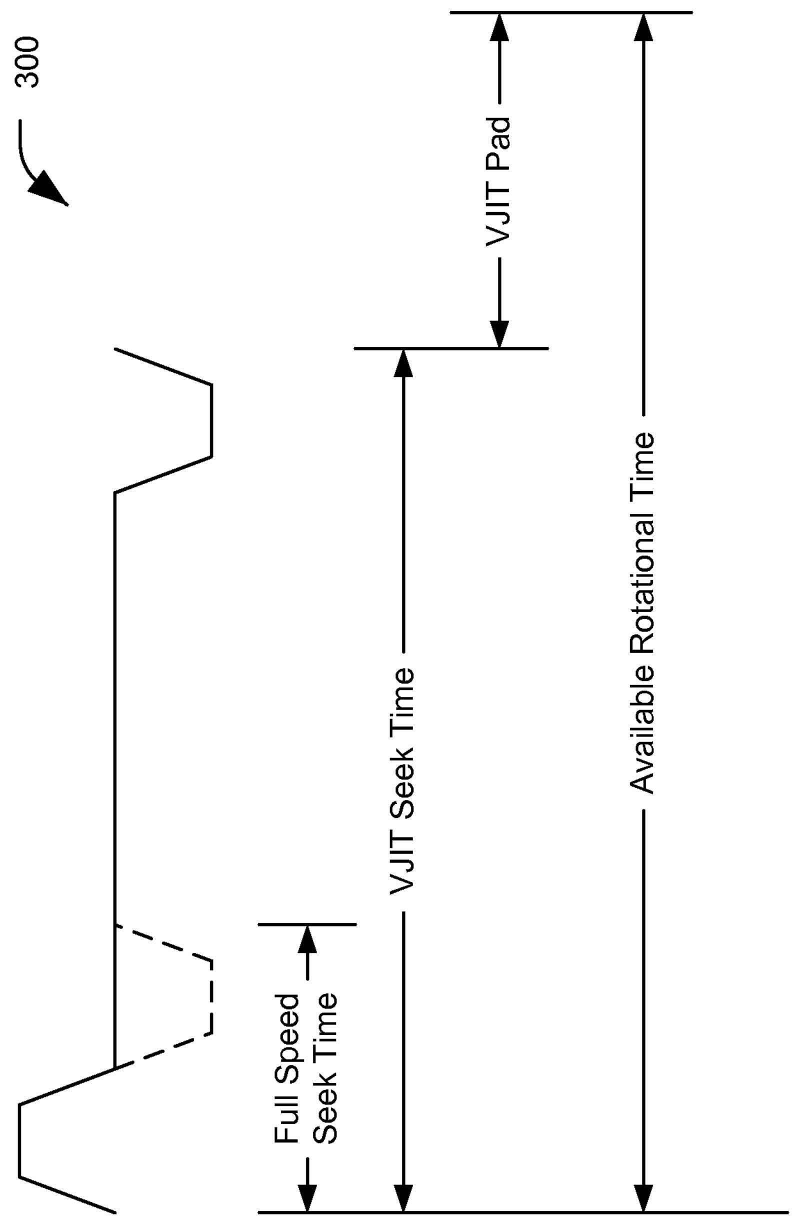
FIG. 3 is a diagram of an illustrative embodiment of a timing diagram for adaptive seek latency.

Referring to FIG. 3, a timing diagram for adaptive seek latency is shown and generally designated 300. The timing diagram 300 shows a relationship between a full speed seek time, a variable just-in-time (VJIT) seek time, a VJIT padding time, and the available rotational time. The VJIT padding time represents an amount of time delay from a seek arrival at a sector to when the data of the sector is transferred. The VJIT padding time may be calculated by the systems or methods described herein. For example, servo firmware can alter a just-in-time seek time to produce a VJIT seek time in conjunction with the additional latency of the VJIT padding time. This could be used to provide additional damping time if needed to allow vibration in a head to decrease.

Figure 4:
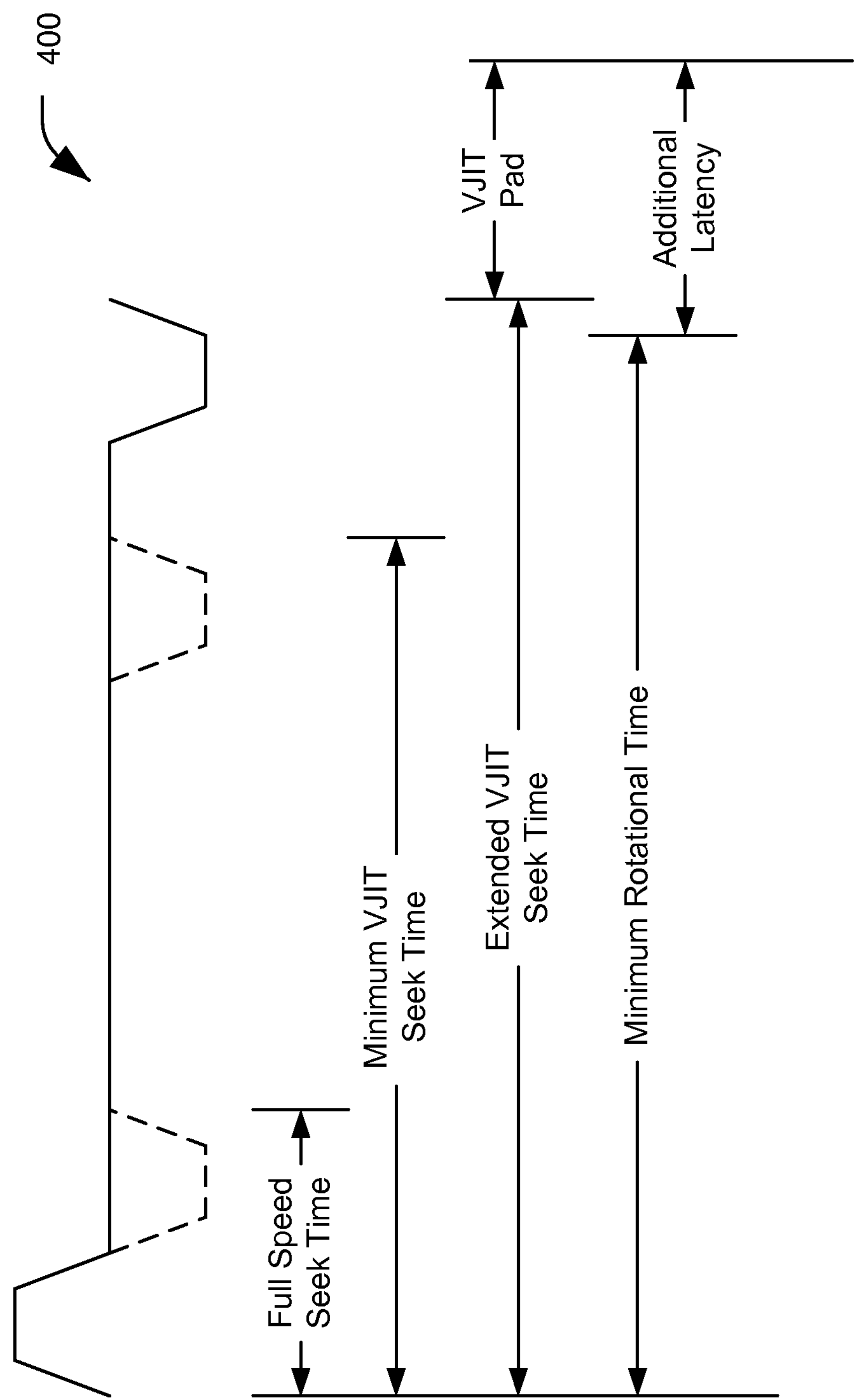
FIG. 4 is a diagram of an illustrative embodiment of a timing diagram for adaptive seek latency.

Referring to FIG. 4, a timing diagram for adaptive seek latency is shown and generally designated 400. The timing diagram 400 shows a relationship between a full speed seek time, a minimum variable just-in-time (VJIT) seek time, an extended VJIT seek time, a VJIT padding time, a minimum rotational time and additional latency. The VJIT padding time represents an amount of time delay from a seek arrival at a sector to when the data of the sector is transferred.

Generally, the timing diagram 400 shows a low power mode that may be implemented by the methods and systems described herein. As a result of the additional latency, a system may use less power because it has a longer available time to move a head to the next location and the system can move the head at a slower speed, thus saving energy compared to moving the head at a faster speed. However, a trade-off in performance may occur to realize power savings.

In some examples, a servo circuit (such as a processor executing firmware or a discrete hardware circuit) may determine an amount of additional latency and provide an indication of the additional latency to be implemented to a controller managing command queuing or VJIT calculations. The additional latency time may be used to achieve power savings. An algorithm may determine the level of power savings, or the amount of additional latency may be variable depending on the goals of the system or the conditions measured. For example, the algorithm may be a function of a component temperature and/or an ambient temperature of the system.

For example, the VJIT padding time may be kept at a constant amount and the VJIT controller can calculate the extended VJIT seek time based on the additional latency received from the servo circuit. The VJIT controller may also calculate a speed necessary to move the head to the selected sector within the extended VJIT seek time. The additional latency calculation may be returned from the servo circuit for each seek command and the extended VJIT seek time may vary per each seek command.

Figure 5:
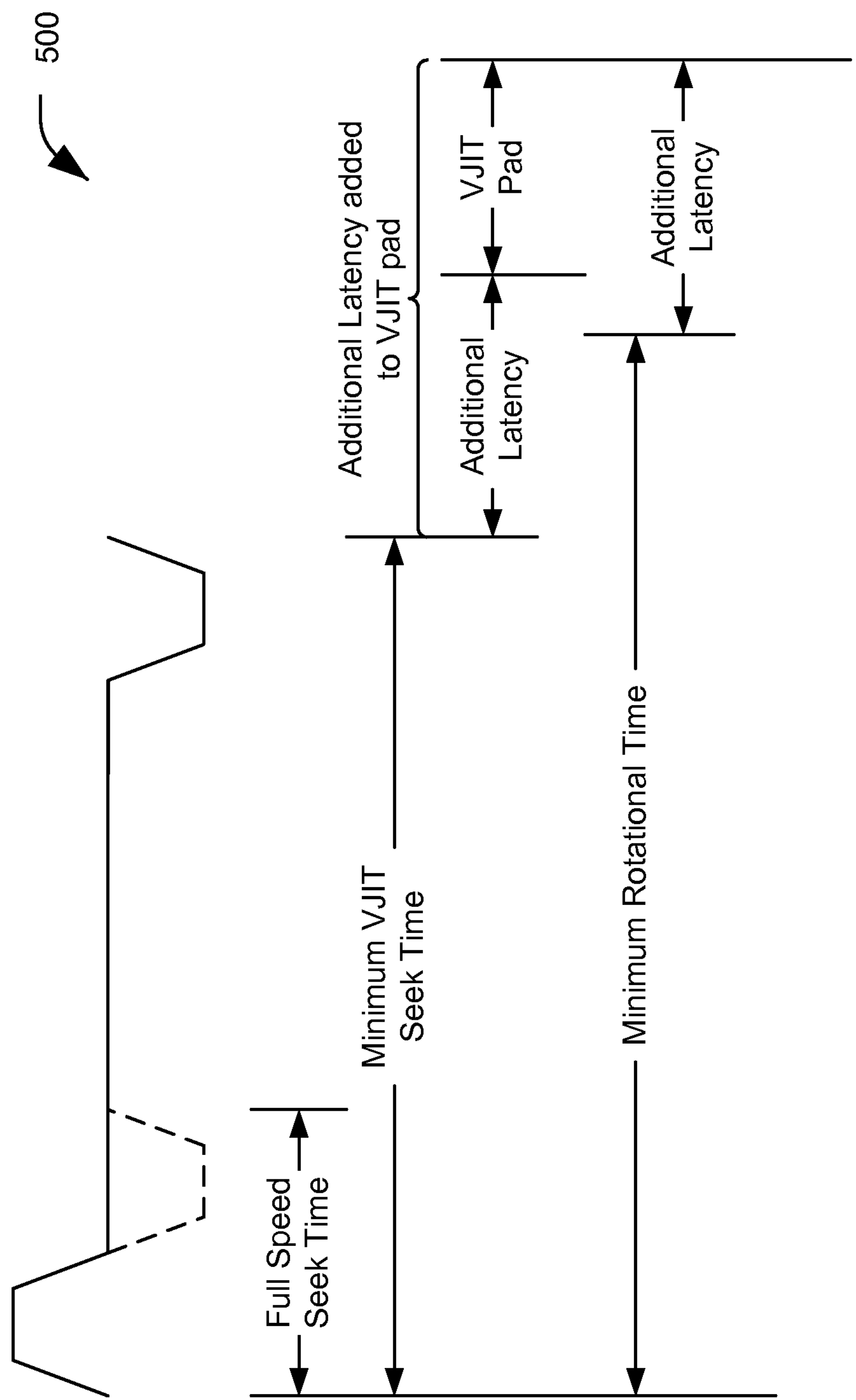
FIG. 5 is a diagram of an illustrative embodiment of a timing diagram for adaptive seek latency.

Referring to FIG. 5, a timing diagram for adaptive seek latency is shown and generally designated 500. The timing diagram 500 shows a relationship between a full speed seek time, a minimum variable just-in-time (VJIT) seek time, a VJIT padding time, a minimum rotational time and additional latency. In the embodiment shown in FIG. 5, additional latency may be added to the VJIT padding time to vary a delay from a seek arrival at a sector to when the data of the sector is transferred.

Generally, the timing diagram 500 shows a head vibration reduction mode that may be implemented by the methods and systems described herein. As a result of the additional latency provided by the servo system, additional latency may be added to the time allowed for head vibration to reduce before transferring data, thus improving the quality of a read or write operation. However, a trade-off in performance may occur.

For example, the minimum VJIT seek time may be calculated and an amount of additional latency may be received from a servo system to be added to the VJIT padding time. The additional latency calculation may be returned from the servo circuit for each seek command and the VJIT padding time may vary per each seek command. An algorithm may determine the additional latency and the amount of additional latency may be flexible depending on the goals of the system or the conditions measured. For example, the algorithm may be a function of a component temperature, an ambient temperature of the system, a read or write fault rate, or any combination thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above embodiments, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. A device comprising:

a servo control circuit configured to:

determine an additional latency time for a seek command;

provide the additional latency time to a data controller; and the data controller configured to add the additional latency time to a seek time representing an amount of time until a specific sector of a data storage medium is in a position to be accessible to a read mechanism, the data controller configured to determine a seek latency by adding the additional latency time and a variable padding time to the seek time, the variable padding time representing an amount of time delay from a seek arrival at a sector to when data of the sector is transferred.

2. The device of claim 1 further comprising the servo control circuit configured to vary the additional latency time per each seek command.

3. The device of claim 1 further comprising the servo control circuit configured to determine the additional delay in real-time based on one or more variable conditions, adjust the additional delay based on the one or more variable conditions, and provide the additional delay to the data controller to be added to a next pending seek command.

4. The device of claim 1 wherein the additional delay and the padding time are variable for each seek command.

5. The device of claim 3 further comprising:

a memory including a command queue;

an interface to receive commands from a host; and a data transducer to read data from a rotatable data storage medium having servo information thereon;

the servo control circuit configured to:

determine a position of the data transducer with respect to the rotatable data storage medium; and provide the additional latency time to the data controller to add the additional latency time to a next pending seek command in the command queue.

6. The device of claim 3 wherein the one or more variable conditions comprise a temperature of the device.

7. The device of claim 3 wherein the one or more variable conditions comprise a temperature of a component of the device.

8. The device of claim 3 wherein the one or more variable conditions comprise a measurement of power consumption.

9. The device of claim 3 wherein the one or more variable conditions comprise an off-track fault rate.

10. A method comprising:

receiving a value based on a condition of a data storage device; and adjusting an additional delay added to a seek time for a pending data access command of the data storage device based on the value, the seek time representing an amount of time until a specific sector of a data storage medium is in a position to store data, the seek time includes a just-in-time (JIT) seek time and a variable JIT padding time representing an amount of time delay from a seek arrival at a sector to when the data of the sector is transferred.

11. The method of claim 10 further comprising the additional delay is received from a servo circuit for each seek command and applied to a next pending seek command.

12. The method of claim 11 further comprising implementing a power saving mode where the variable JIT padding time is kept at a constant amount and an extended JIT seek time is calculated based on the additional delay.

13. The method of claim 12 wherein the value comprises a temperature.

14. The method of claim 11 further comprising implementing a head vibration reduction mode that includes setting a variable JIT seek time and the variable JIT padding time, where the variable JIT seek time may vary for each seek during the head vibration reduction.

15. The method of claim 14 wherein the value comprises a fault rate.

16. The method of claim 11 further comprising determining the additional delay in real-time and providing the additional delay to a controller in response to a seek command, wherein the controller adds the additional delay to a next pending seek command.

17. A device comprising:

an interface circuit to receive commands;

a memory having a command queue to store pending commands;

a data storage controller to execute the pending commands to access a data storage medium; and a servo controller configured to calculate an additional delay and to add the additional delay a variable padding time to a seek time of a next pending seek command to determine a seek latency, the variable padding time representing an amount of time delay from a seek arrival at a sector to when data of the sector is transferred.

18. The device of claim 17 further comprising the servo controller configured to calculate the additional delay based on a measurement of a variable condition of the device and the servo controller configured to adjust the additional delay as the condition varies.

19. The device of claim 17, further comprising the seek time includes a just-in-time (JIT) seek time.

20. The device of claim 17, further comprising the variable padding time includes a variable JIT padding time representing an amount of time delay from a seek arrival at a sector to when the data of the sector is transferred.

* * * * *